United States Patent [19]
Stock

[11] Patent Number: 5,494,369
[45] Date of Patent: Feb. 27, 1996

[54] CONNECTOR AND METHOD FOR INTERCONNECTING HOLLOW FRAME MEMBERS

[75] Inventor: Marvin G. Stock, Cincinnati, Ohio

[73] Assignee: Stock Mfg. & Design Co., Inc., Cleeves, Ohio

[21] Appl. No.: 348,566

[22] Filed: Dec. 2, 1994

[51] Int. Cl.⁶ ........................................ F16B 2/04
[52] U.S. Cl. .......................... 403/295; 403/291; 403/220; 403/178; 40/155
[58] Field of Search .................... 403/295, 297, 403/292, 291, 174, 178, 170, 203, 231, 205, 403, 402, 401, 225, 220; 40/155

[56] References Cited

U.S. PATENT DOCUMENTS

| | | | |
|---|---|---|---|
| 2,281,220 | 4/1942 | Anderson | 403/205 |
| 2,290,430 | 7/1942 | Heiser | 403/297 |
| 2,989,788 | 6/1961 | Kessler | 20/56.1 |
| 3,218,097 | 11/1965 | Bowers et al. | 287/54 |
| 3,645,569 | 2/1972 | Reilly | 403/295 X |
| 3,698,114 | 10/1972 | Hirsch et al. | 40/155 |
| 3,854,831 | 12/1974 | Gutner | 403/231 X |
| 3,866,380 | 2/1975 | Benson | 403/231 X |
| 4,105,348 | 8/1978 | Anderson et al. | 403/295 X |
| 4,205,470 | 6/1980 | Kapnek | 40/155 |
| 4,636,105 | 1/1987 | Johansson | 403/205 |
| 4,683,634 | 8/1987 | Cole | 29/412 |
| 4,862,612 | 9/1989 | Sugihara et al. | 40/155 |
| 4,930,924 | 6/1990 | Hunt | 403/225 X |
| 4,943,180 | 7/1990 | Durhman | 403/295 |
| 4,974,352 | 12/1990 | Chen | 40/152 |
| 5,040,456 | 8/1991 | Hayes | 403/402 X |
| 5,076,736 | 12/1991 | Grewe et al. | 403/295 |
| 5,169,258 | 12/1992 | Raynak | 403/178 X |

Primary Examiner—Kenneth J. Dorner
Assistant Examiner—Harry C. Kim
Attorney, Agent, or Firm—Biebel & French

[57] ABSTRACT

A connector and method for interconnecting separate frame members to form a display frame which does not require the use of tools for the assembly or disassembly thereof. The connector includes a first plate, a second plate spaced-apart from the first plate, and a resilient spacer retained between the first and second plates which are each disposed within ends of the frame members. The spacer is formed from a resilient non-setting material which expands between the first and second plates to permit the first and second plates to be frictionally retained within the frame members.

16 Claims, 3 Drawing Sheets

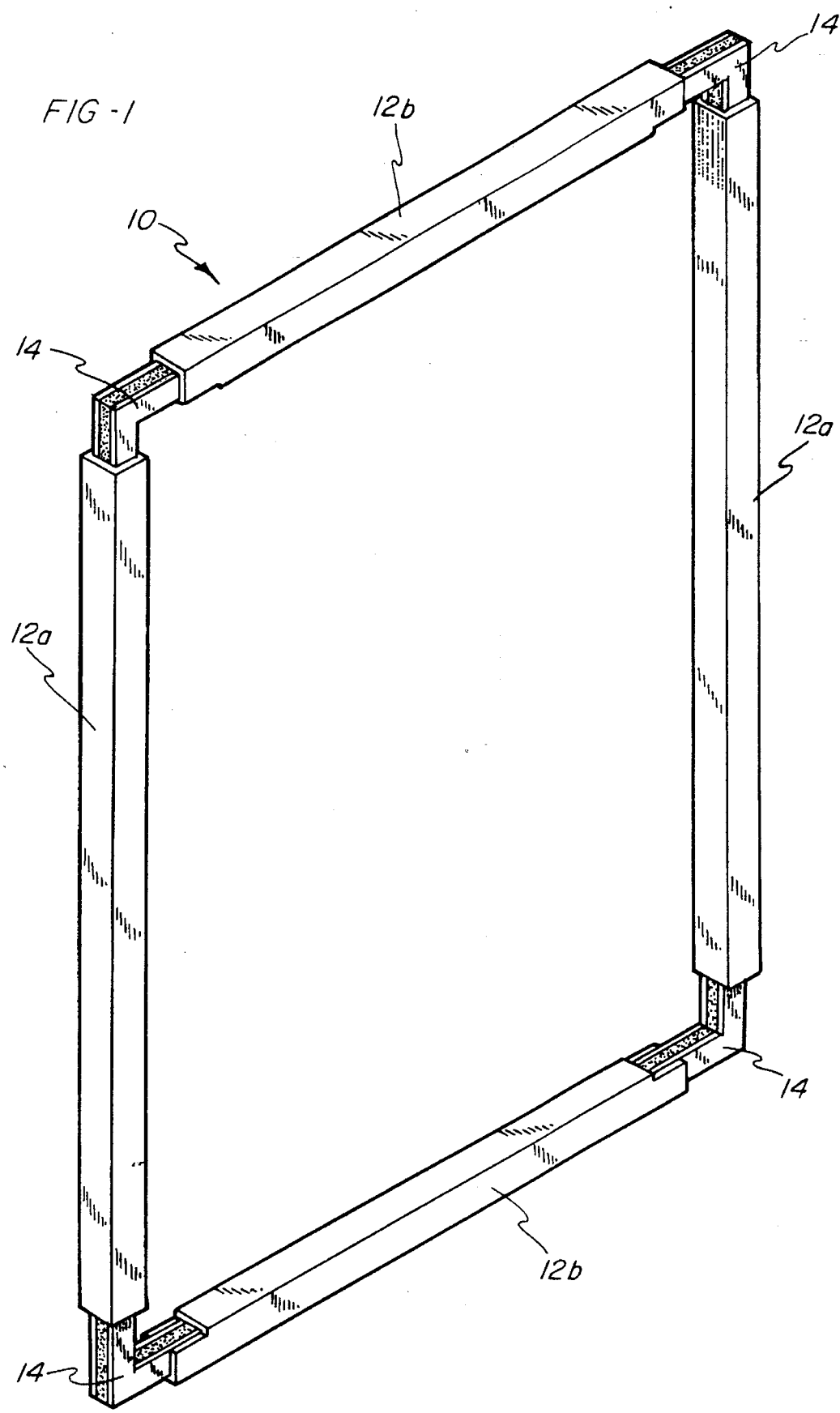

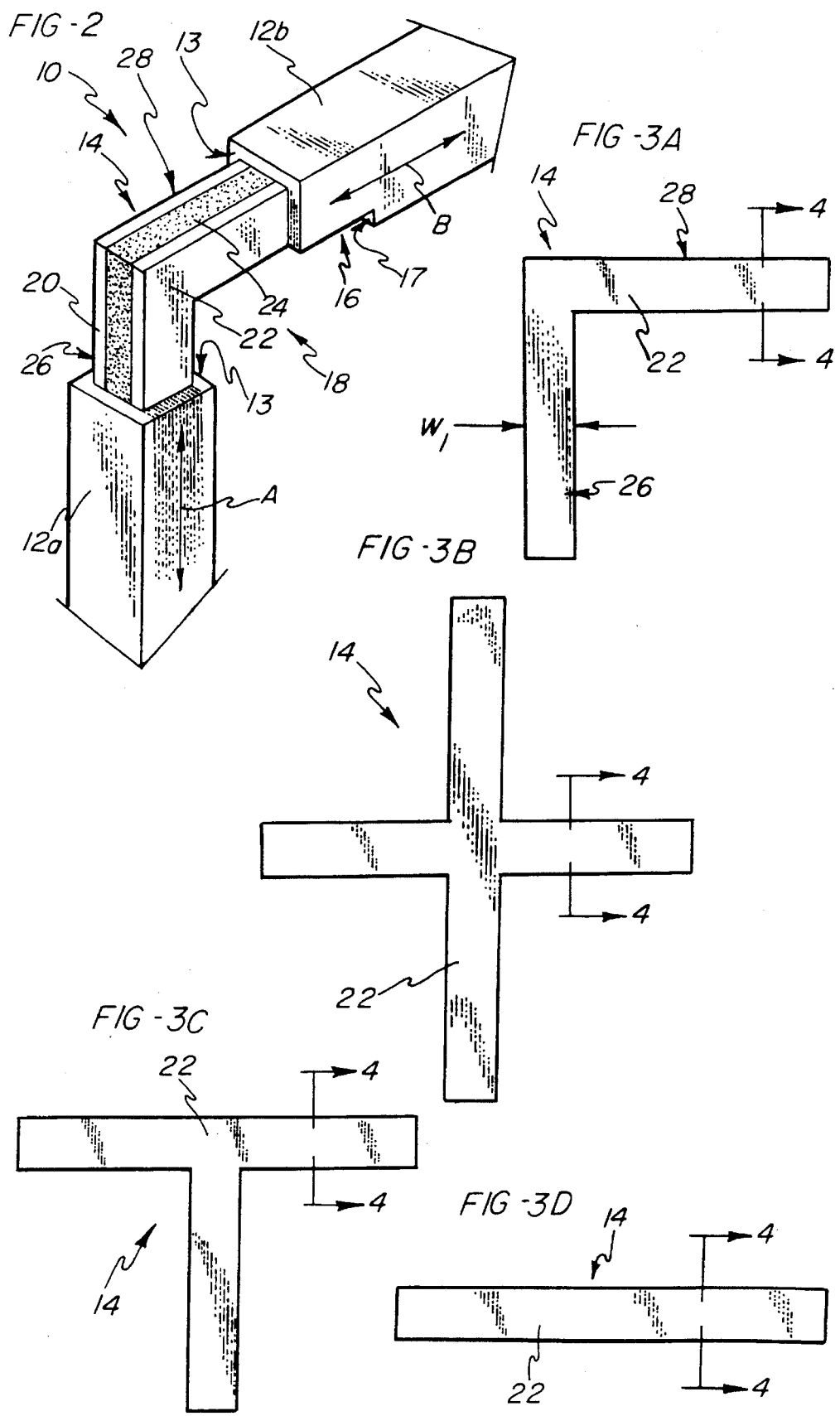

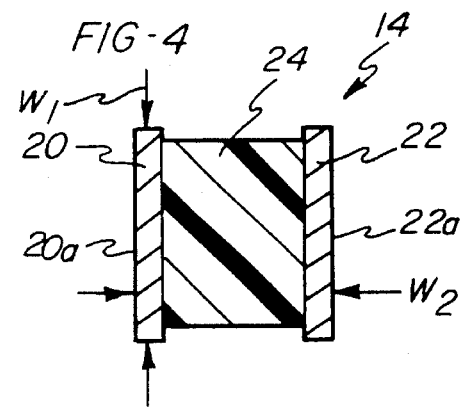
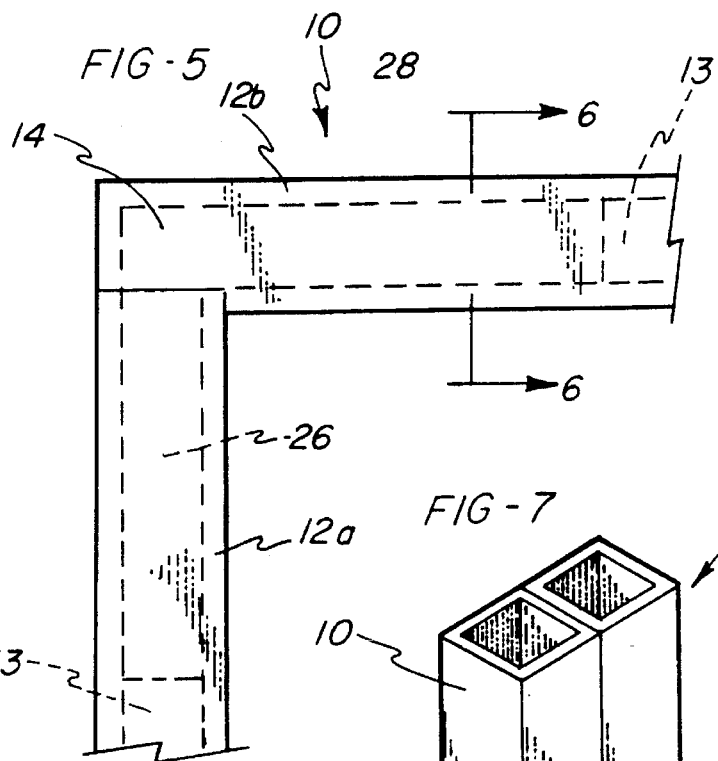
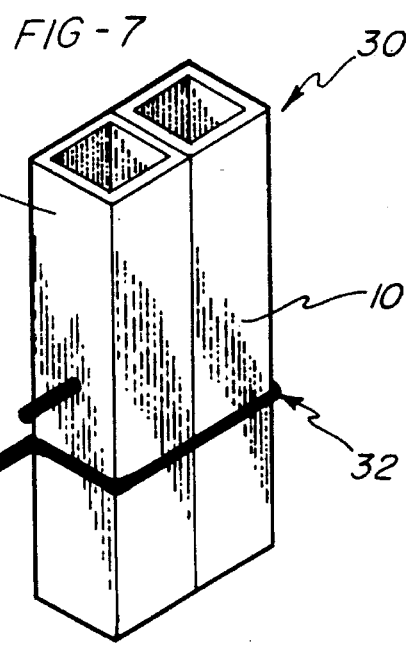
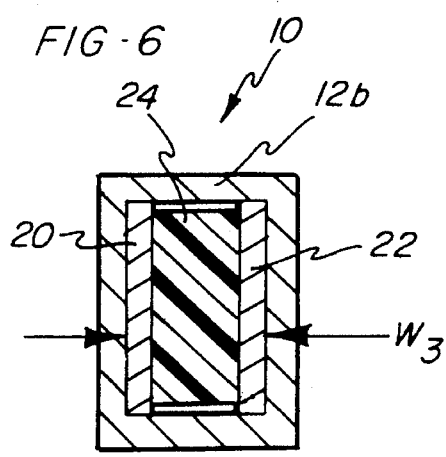

CONNECTOR AND METHOD FOR INTERCONNECTING HOLLOW FRAME MEMBERS

FIELD OF THE INVENTION

This invention relates to a connector, and more particularly to a connector and a method for interconnecting separate frame members to form a display frame which does not require the use of tools for the assembly or disassembly thereof.

BACKGROUND OF THE INVENTION

A modular display system typically comprises various sizes and shapes of individual frame members which are interconnected together to form a plurality of display frames. The display frames support various types of display panels that are attached thereto to form the modular display system.

Such modular display systems are typically used by exhibitors to display products or services at trade shows and conventions. An important feature of modular display systems is the ease and quickness by which the display systems can be assembled and disassembled.

Known display systems are typically assembled by using small hardware items such as screws, clips or the like, which complicate the assembly and disassembly process, and which may require the use of tools to facilitate the installation and removal thereof. Further, the use of such hardware is time consuming, and the individual hardware items must be kept track of to prevent them from being misplaced every time the display system is assembled and disassembled.

What is needed therefore is a connector for interconnecting separate frame members of a modular display system to form a display frame which does not require the use of tools, and which is easy and quick to assemble and disassemble.

SUMMARY OF THE INVENTION

Thus, it is a primary object of this invention to provide a connector for interconnecting separate frame members of a modular display system to form a display frame which does not require the use of tools for the assembly or disassembly thereof.

It is a further object of the invention to provide a connector which permits a display frame to be easily assembled and disassembled.

It is yet another object of the invention to provide a connector which can be formed of various shapes to permit numerous display frame configurations.

In one aspect of the invention, a connector is provided which includes a first plate, a second plate spaced-apart from the first plate, and a resilient spacer retained between the first and second plates wherein the spacer is expandable to permit the first and second plates to be frictionally retained within a hollow frame member.

In another aspect of the invention, a display frame is provided which includes a first hollow frame member having a first opening therethrough, a second hollow frame member having a second opening therethrough and a connector for connecting the first frame member to the second frame member. The connector includes a first plate partially disposed within the first and second openings, a second plate partially disposed within the first and second openings and spaced-apart from the first plate, and resilient spacer arrangement disposed between the first and second plates for urging the first and second plates into abutment with an inner surface of each of the first and second frame members to frictionally retain the connector within the first and second openings.

In still another aspect of the invention, a method is provided for connecting a first frame member to a second frame member with a connector having at least a first plate, a second plate spaced-apart from the first plate, and a resilient spacer retained between the first and second plates. The method includes the steps of pressing a first leg of the first and second plates together to compress the resilient spacer, inserting the compressed first leg fully into an end of the first frame member, pressing a second leg of the first and second plates together to compress the resilient spacer, inserting the compressed second leg fully into an end of the second frame member, and permitting the resilient spacer to expand thus urging the first and second plates into abutment with an inner surface of the first and second frame members to frictionally retain the connector within the first and second frame members.

These and other objects and advantages of the invention will be apparent from the following description, the accompanying drawings and the appended claims.

BRIEF DESCRIPTION OF THE DRAWINGS

FIG. 1 is a perspective view of a partially assembled display frame showing connectors of the present invention partially inserted into separate frame members to form the display frame;

FIG. 2 is an enlarged perspective view of a connector of the present invention partially inserted into separate frame members to form a corner portion of the display frame;

FIGS. 3A–3D are side views of different connectors of the present invention such as a corner connector, junction connector, T-connector and straight connector, respectively;

FIG. 4 is a sectional view of the connector of the present invention taken along the lines 4—4 of FIGS. 3A–3D;

FIG. 5 is a side view of an assembled corner portion of the display frame which incorporates the connector of the present invention;

FIG. 6 is a sectional view of the assembled corner portion of the display frame taken along the line 6—6 of FIG. 5; and FIG. 7 is a perspective view of portions of two adjacent display frames coupled together to form a modular display system.

DETAILED DESCRIPTION OF THE PREFERRED EMBODIMENTS

Referring now to FIG. 1, there is shown a partially assembled display frame 10 formed from a plurality of hollow frame members 12a and 12b, and a plurality of connectors 14 which interconnect the separate frame members 12a, 12b together to form the display frame 10. As best seen in FIG. 2, each of the frame members 12a, 12b has an end opening 13 extending therethrough. Further, the frame members 12b include a notched end portion 16 which defines a shoulder 17 to facilitate forming a corner portion 18 of the display frame 10 as described further below.

In the described embodiment, the frame members 12a, 12b are formed from extruded aluminum having a square cross-section. However, any suitable material can be used to form the frame members such as a plastic, resin or composite material, and the frame members can have any suitable cross-section. Further, the frame members 12a, 12b and connectors 14 are illustrated as being planar. However, it is deemed to be within the scope of this invention to provide curved frame members 12a, 12b and curved connectors 14 so that modular display systems of varying shapes and sizes can be formed.

As best seen in FIGS. 2 and 4, the connector 14 includes two mutually oriented plates 20, 22 which are separated by a resilient or elastomeric spacer 24 adhesively bonded to, or otherwise retained between mutually opposing inner side surfaces of the plates 20, 22 to provide the connector 14 with a variable width. The spacer 24 is preferably formed from a non-setting resilient or elastomeric material which retains its resiliency so that, in an assembled state, the connector 14 is retained within the frame members 12a, 12b in a friction or interference fit. One such non-setting resilient or elastomeric material is silicon-based foam rubber which is readily available in the marketplace.

As shown in FIG. 2, the spaced-apart plates 20, 22 of the corner connector 14 form a first leg 26 and a second leg 28 which extends transversely from an end of the first leg 26. Each of the plates 20, 22 has a fixed width $W_1$ (FIG. 3A) which permits the connector 14 to be inserted into the frame portions 12a, 12b. In the described embodiment, the plates 20, 22 are formed from metal. However, any suitable material can be used to form the plates.

In a relaxed state, the connector 14 has a width $W_2$ (FIG. 4) representing the distance between the engaging surfaces 20a, 22a, respectively, of the plates 20, 22. The relaxed-state width $W_2$ exceeds a fixed width $W_3$ (FIG. 6) of the end opening 13 of the frame members 12a, 12b by approximately 15–30%. The relaxed-state width $W_2$ is selected by taking into account the compressibility limit of the spacer 24 so that the connector 14 can be compressed from the relaxed-state width $W_2$ to a width slightly less than the width $W_3$ during insertion of the connector 14 into the frame members 12a, 12b. Once inserted into the frame members 12a, 12b, the connector 14 expands to conform to the width $W_3$ as discussed further below.

As shown in FIGS. 3A–3D, the connector 14 can be provided in shapes other than the above-described corner connector (FIG. 3A). For instance, the connector 14 can be provided as a junction connector (FIG. 3B), T-connector (FIG. 3C) or straight connector (FIG. 3D). The various connector 14 shapes permit numerous display frame 10 configurations.

The construction of the corner portion 18 of the display frame 10 which utilizes the corner connector 14 will now be discussed., It is to be understood that the assembly and disassembly of a different display frame incorporating the other connector 14 shapes is performed in the same manner.

The display frame 10 is assembled by pressing the spaced-apart plates 20, 22 of the first leg 26 together to compress the spacer material 24 so that the first leg 26 can fit within an end of the frame member 12a. The first leg 26 is inserted into the frame member 12a in the direction of double arrow A (FIG. 2) until the second leg 28 of the connector 14 abuts the end of the frame member 12a.

The spaced-apart plates 20, 22 of the second leg 28 are also pressed together to compress the spacer material 24 so that the second leg 28 fits within the notched end portion 16 of the frame member 12b. The second leg 28 is inserted into the frame member 12b in the direction of double arrow B (FIG. 2) until the shoulder 17 abuts the frame member 12a. The assembled corner portion 18 of the display frame 10 is shown in FIG. 5.

When the legs 26, 28 of the connector 14 are inserted into the respective frame members 12a, 12b, the compressed spacer material 24 partially expands to urge the respective plates 20, 22 into abutting contact with respective inner surfaces of the frame members 12a, 12b. Thus, in an assembled state, the spacer material 24 is maintained under compression to urge the plates 20, 22 outwardly into a frictional or interference fit with the respective frame members 12a, 12b.

To disassemble the corner portion 18 of the display frame 10, the frame members 12a, 12b are pulled in the directions shown by the double arrows A, B, respectively, to overcome the frictional forces retaining the corner connector 14 within the frame members 12a, 12b.

With the display frame 10 assembled as described above, a plurality of display frames can be coupled together to form a modular display system 30, a portion of which is shown in FIG. 6. The separate display frames 10 can be coupled together by a plurality of keys 32 which rigidly lock the respective frame members 10 together to form the modular display system 30.

While the forms of the device herein described constitute the preferred embodiments of the invention, it is to be understood that the invention is not limited to these precise forms of device, and that changes may be make therein without departing from the scope of the invention which is defined in the appended claims.

For instance, the connector 14 of the present invention could be formed in shapes different from those described above such that the connector legs extend other than perpendicular relative to each other.

What is claimed is:

1. A display frame comprising:
    a first hollow frame member having a first opening therethrough;
    a second hollow frame member having a second opening therethrough;
    a connector coupling said first frame member to said second frame member; and
    said connector including a first plate having a first leg disposed within said first opening and a second leg disposed within said second opening, a second plate spaced-apart from said first plate and having a third leg disposed within said first opening and a fourth leg disposed within said second opening, and a resilient spacer retained between said first and second plates which urges said first and said second plates away from each other into abutment with an inner surface of said first and second frame members to frictionally retain said connector within said first and second openings.

2. The display frame claimed in claim 1, wherein said resilient spacer is maintained in compression while said connector is retained within said first and second openings.

3. The display frame claimed in claim 1, wherein said resilient spacer is adhesively bonded to an inner surface of each of said first and second plates.

4. The display frame claimed in claim 1, wherein said resilient spacer is formed from a non-setting material.

5. The display frame claimed in claim 4, wherein said non-setting material is a silicon-based rubber.

6. The display frame claimed in claim 1, further including a plurality of additional frame members, and said first and second plates each including a plurality of additional legs each disposed within an opening defined by one of said plurality of additional frame members.

7. The display frame claimed in claim 1, wherein said connector has a width greater than said first and second openings when said connector is not inserted within said openings.

8. A display frame comprising:

a first hollow frame member defining a first opening therethrough;

a second hollow frame member defining a second opening therethrough;

a connector for connecting said first frame member to said second frame member, said connector including a first plate partially disposed within said first and second openings, a second plate partially disposed within said first and second openings and spaced-apart from said first plate, and resilient means disposed between said first and second plates for urging said first and second plates into abutment with an inner surface of each of said first and second frame members to frictionally retain said connector within said first and second openings.

9. The display frame claimed in claim 8, wherein said resilient means includes an expandable spacer.

10. The display frame claimed in claim 9, wherein said expandable spacer is maintained in compression while said connector is retained within said first and second openings.

11. The display frame claimed in claim 9, wherein said expandable spacer is adhesively bonded to an inner surface of each of said first and second plates.

12. The display frame claimed in claim 9, wherein said expandable spacer is formed from a non-setting material.

13. The display frame claimed in claim 12, wherein said non-setting material is a silicon-based rubber.

14. The display frame claimed in claim 9, further including a plurality of additional frame members, and said first and second plates including a plurality of additional legs each disposed within an opening defined by one of said plurality of additional frame members.

15. The display frame claimed in claim 8, wherein said connector has a width greater than said first and second openings when said connector is not inserted within said openings.

16. A method of connecting a first frame member to a second frame member with a connector having at least a first plate, a second plate spaced-apart from the first plate, and a resilient spacer retained between the first and second plates, the method comprising the steps of:

pressing a first leg of the first and second plates together to compress the resilient spacer;

inserting said compressed first leg fully into an end of the first frame member;

pressing a second leg of the first and second plates together to compress the resilient spacer;

inserting said compressed second leg fully into an end of the second frame member; and permitting said resilient spacer to expand thus urging the first and second plates into abutment with an inner surface of the first and second frame members to frictionally retain the connector within the first and second frame members.

* * * * *